United States Patent
Fu (10) Patent No.: US 9,378,114 B2
(45) Date of Patent: Jun. 28, 2016

(54) CODE ANALYSIS METHOD, CODE ANALYSIS SYSTEM AND COMPUTER STORAGE MEDIUM

(71) Applicant: TENCENT TECHNOLOGY (SHENZHEN) COMPANY LIMITED, Shenzhen, Guangdong (CN)

(72) Inventor: Yanghui Fu, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/402,821

(22) PCT Filed: May 2, 2013

(86) PCT No.: PCT/CN2013/075095
§ 371 (c)(1),
(2) Date: Nov. 21, 2014

(87) PCT Pub. No.: WO2013/174200
PCT Pub. Date: Nov. 28, 2013

(65) Prior Publication Data
US 2015/0113332 A1    Apr. 23, 2015

(30) Foreign Application Priority Data
May 24, 2012   (CN) .......................... 2012 1 0164205

(51) Int. Cl.
*G06F 11/00* (2006.01)
*G06F 11/36* (2006.01)
*G06F 9/44* (2006.01)

(52) U.S. Cl.
CPC .............. *G06F 11/3608* (2013.01); *G06F 8/75* (2013.01); *G06F 11/3604* (2013.01)

(58) Field of Classification Search
CPC ... G06F 11/3668–11/3696; G06F 8/30–8/437; G06F 11/3604; G06F 11/3608; G06F 8/75
See application file for complete search history.

(56) References Cited

U.S. PATENT DOCUMENTS

2004/0122791 A1* 6/2004 Sea ........................... G06F 8/51
2004/0221270 A1  11/2004 Witchel et al.
(Continued)

FOREIGN PATENT DOCUMENTS

| CN | 1983209 A | 6/2007 |
| CN | 101145102 A | 3/2008 |
| CN | 102419729 A | 4/2012 |

OTHER PUBLICATIONS

Devart: Code Compare, Apr. 24, 2013.*
International Search Report (in English and Chinese) for PCT/CN2013/075095, mailed Aug. 15, 2013; ISA/CN.
Written Opinion of the International Searching Authority for PCT/CN2013/075095 (in English and Chinese), mailed Aug. 15, 2013; ISA/CN.
(Continued)

*Primary Examiner* — Michael Maskulinski
(74) *Attorney, Agent, or Firm* — Harness, Dickey & Pierce, P.L.C.

(57) ABSTRACT

Provided is a code analysis method, a code analysis system and a computer storage medium. The method includes: obtaining a code change list; analyzing the code change list, obtaining a change list corresponding to each type of programming languages from the code change list, determining a mapping relationship between the change list and the type of programming languages; obtaining code analysis tool information and analysis rule information according to the mapping relationship, and generating an execution solution; and calling a code analysis tool and an analysis rule according to the execution solution to perform the code analysis and obtain a code analysis result. Examples of the present disclosure may integrate multiple code analysis tools and analysis rules, meet requirements of the code analysis on different types of programming languages, reduce workload of a developer and a tester, and increase efficiency of the code analysis.

12 Claims, 2 Drawing Sheets

(56) References Cited

U.S. PATENT DOCUMENTS

| | | | |
|---|---|---|---|
| 2008/0052690 A1 | 2/2008 | Bharadwaj | |
| 2008/0066058 A1 | 3/2008 | Aoyama et al. | |
| 2008/0229290 A1* | 9/2008 | Jones | G06F 8/71 717/137 |
| 2012/0102462 A1 | 4/2012 | Kushneryk et al. | |
| 2013/0332902 A1* | 12/2013 | Wang | G06F 8/38 717/122 |

OTHER PUBLICATIONS

International Preliminary Report for International Application No. PCT/CN2013/075095 dated Nov. 25, 2014.

Chinese Office Action for Application No. 2012101642054 dated Aug. 12, 2015, and an English concise explanation of relevance thereof.

* cited by examiner

CODE ANALYSIS METHOD, CODE ANALYSIS SYSTEM AND COMPUTER STORAGE MEDIUM

CROSS-REFERENCE TO RELATED APPLICATIONS

This application is a U.S. National Phase Application under 35 U.S.C. 371 of International Application No. PCT/CN2013/075095, Filed on May 2, 2013, and published in Chinese as WO 2013/174200 on Nov. 28, 2013 . This application claims priority of Chinese Patent Application No. 201210164205.4, filed on May 24, 2012. The entire disclosures of all of the above applications are incorporated herein by reference.

TECHNICAL FIELD

The present disclosure relates to code analysis technologies, and more particularly to a code analysis method, a code analysis system and a computer storage medium.

BACKGROUND

In order to discover programming defects of source codes such as standardization, logicality or security defects, a code analysis tool may analyze source codes or compiled codes without execution of the codes to obtain an evaluation report. During an application, the code analysis tool generally analyzes codes stored in a software configuration management database according to a predefined analysis rule and then outputs an analysis result.

A conventional code analysis tool is generally applicable to a specific type of programming languages and has a single category of analyzing functions. Therefore, there are currently many types of code analysis tools, which are classified according to different fields. For example, there are respective types of code analysis tools for category detection, style detection, programming standardization and property detection, security detection, etc. Moreover, the conventional code analysis tool is generally executed manually by a developer or a tester, which increases workload of the developer or the tester.

Due to different programming levels and different programming tools used by different developers in a large software research and development organization, product or project, multiple types of codes may be obtained through multiple types of coding manners. Because each code analysis tool is applicable to only a specific type of programming languages, a single code analysis tool cannot make comprehensive code analysis for a large-scale software system realized by multiple types of programming languages. Thereby, multiple code analysis tools respectively corresponding to different types of programming languages should be used to make the code analysis for many times, which costs time and human resources. Moreover, the code analysis are executed manually, which further costs time and human resources, increases workload of the developer and the tester and affects efficiency of code analysis.

SUMMARY

Examples of the present disclosure provide a code analysis method and a code analysis system. The method and the system may meet requirements of code analysis on different types of programming languages, reduce workload of a developer and a tester and increase efficiency of code analysis.

A code analysis method includes:
obtaining a code change list;
analyzing the code change list, obtaining a change list corresponding to each type of programming languages from the code change list, determining a mapping relationship between the change list and the type of programming languages;
obtaining code analysis tool information and analysis rule information according to the mapping relationship, and generating an execution solution; and
calling a code analysis tool and an analysis rule according to the execution solution to perform the code analysis and obtain a code analysis result.

A code analysis system includes:
a change detecting unit, configured to obtain a code change list;
a code pre-analyzing unit, configured to analyze the code change list, obtain a change list corresponding to each type of programming languages from the code change list, determine a mapping relationship between the change list and the type of programming language; and
an analysis executing unit, configured to obtain code analysis tool information and analysis rule information according to the mapping relationship, and generate an execution solution, and call a code analysis tool and an analysis rule according to the execution solution to perform the code analysis and obtain a code analysis result.

One or more computer storage mediums containing a computer-executable instruction is provided. The computer-executable instruction is configured to perform a code analysis method, and the code analysis method includes:
obtaining a code change list;
analyzing the code change list, obtaining a change list corresponding to each type of programming languages from the code change list, determining a mapping relationship between the change list and the type of programming languages;
obtaining code analysis tool information and analysis rule information according to the mapping relationship, and generating an execution solution; and
calling a code analysis tool and an analysis rule according to the execution solution to perform the code analysis and obtain a code analysis result.

According to the foregoing technical solution, a code change list is obtained and analyzed to obtain a change list corresponding to the type of programming language from the code change list. A mapping relationship between the change list and the type of programming language is determined. A matching code analysis tool and a matching analysis rule are called according to the mapping relationship to perform the code analysis and obtain an analysis result. The technical solution may realize the integration of multiple code analysis tools and analysis rules, meet requirements of the code analysis on different types of programming languages, reduce workload of a developer and a tester and increase efficiency of the code analysis.

DETAILED DESCRIPTION

Technical solution of the present disclosure will be described hereinafter with reference to the accompanying drawings and examples. A code analysis mode will be described first according to an example of the present disclosure, and then a code analysis system will be described according to an example of the present disclosure.

A first example is provided.

Figure 1:
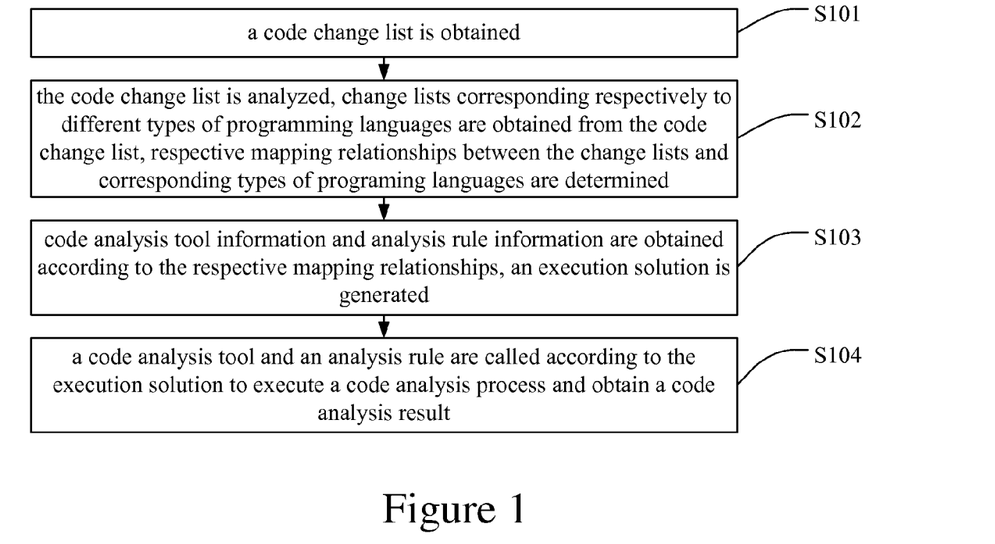
FIG. 1 is a schematic flowchart illustrating a code analysis method in accordance with a first example of the present disclosure.

FIG. 1 is a schematic flowchart illustrating a code analysis method in accordance with the first example of the present disclosure. As shown in FIG. 1, the code analysis method includes following blocks.

At block S101, a code change list is obtained, and block S102 is performed.

At block S102, the code change list is analyzed, change lists corresponding respectively to different types of programming languages are obtained from the code change list, respective mapping relationships between the change lists and corresponding types of programming languages are determined, and block S103 is performed.

At block S103, code analysis tool information and analysis rule information are obtained according to the respective mapping relationships, an execution solution is generated, and block S104 is performed.

At block S104, a code analysis tool and an analysis rule are called according to the execution solution to execute a code analysis process and obtain a code analysis result.

Based on the above example of the present disclosure, the code change list is obtained and analyzed to obtain the change lists corresponding respectively to different types of programming languages from the code change list. The mapping relationships between the change lists and corresponding types of programming languages are determined. A matching code analysis tool and a matching analysis rule are called according to the mapping relationships to perform the code analysis process and obtain the code anaylysis result. Thereby, multipe code analysis tools and analysis rules are integarated together, which may meet the requirements of the code analysis on different types of programming languages, reduce the workload of a developer and a tester, and increase efficiency of the code analysis.

In the process of obtaining the code change list at block 101, the code change list may be obtained through setting different triggering conditions based on different applications or considerations. In a first implementation, a scanning frequency may be preset, each code software configuration management database may be scanned according to the preset scanning frequency to obtain the code change list. In a second implementation, a code analysis instruction may be inputted when the code analysis is required, and each code software configuration management database is scanned after the code analysis instruction is received to obtain the code change list. For example, the code analysis instruction may be an operation of clicking a button for starting a code analysis process.

In an example, the first implementation may be used. In this way, a state of the code software configuration management database may be detected automatically, and the code analysis process may be triggered automatically, thereby recuding the workload of the developer and tester.

According to actual requirements, one or more code software configuration management databases may be configured, which is not described in detail herein.

In the process of obtaining the code change list at block 101, if no code is changed, the subsequent processes are not performed. Otherwise, a pre-analyzing process at block 102 is performed. The code change list is obtained from different code software configuration management databases and storage formats may be different in different code software configuration management databases. Thereby, the efficiency of generating the execution solution may be affected if the code change list is directly used in subsequent processing. As such, the obtained code change list may be stored in a first preset format to facilitate the usage at block S102.

The first preset format may be any of possible formats, as long as the first preset format is in conform with a description mode expressed by an information structure. The first preset format may be set as an xml format because the xml format has advantages such as openness, simplicity, self-description, separation between structure and contents, good extendability, and irrelevance with a platform, etc.

When the code change list is analyzed to determine the mapping relationships at block S102, the mapping relationships may be determined according to differences between different types of programming languages. For example, it is supposed that there are two types of programming languages C++ and Java in the code change list. After the pre-analyzing process at block S102, a mapping relationship is obtained between the programming language C++ and a change list of C++ codes which have been changed, and a mapping relationship is obtained between the programming language Java and a change list of Java codes which have been changed. After respective mapping relationships between programming languages and corresponding change lists are obtained, the subsequent process of generating the execution solution is performed.

The change lists may be obtained from different code software configuration management databases, and storage formats in different code software configuration management databases may be different. Consequently, the respective mapping relationships between different types of programming languages and the corresponding change lists also have different formats. Especially, in the case that there are many types of programming languages, the efficiency of generating the execution solution may be affected if the subsequent processes are performed directly. Thereby, each of the mapping relationships may be transformed to a second preset format and then stored in an implementation. Thus, the execution solution may be generated based on the same format no matter which type of original format is used by a change list.

The second preset format may be any of possible formats, as long as the second preset format is in conform with a description mode expressed by an information structure. Besides, the second preset format may be the same as or different from the first preset format. The second preset format may be set as an xml format because the xml format has advantages such as openness, simplicity, self-description, separation between structure and contents, good extendability, and irrelevance with a platform, etc.

After respective mapping relationships for different types of programming languages are obtained, respective code anaylysis tool information and analysis rule information corresponding to the mapping relationships may be obtained and the execution solution may be generated, which may be run at background. In this case, a relationship between each type of programming languages, each code analysis tool and each code analysis rule needs be stored in advance. When the execution solution is generated, it is thus possible to determine, based on the relationship, which code analysis tool and which analysis rule may be used to perform the code analysis for a change list corresponding to a type of programming languages, and it is also possible to generate the execution solution based on information of the used code analysis tool and the information of the used code analysis rule.

Each generated execution solution may be sorted in a third preset format so that the code analysis based on each execution solution is performed based on the same type of formats, which may reduce complexity of executing the execution solution and further increase efficiency.

The third preset format may be any of possible formats, as long as the third preset format is in conform with a description mode expressed by an information structure. The third present format may be the same as or different from the first preset format or the second preset format. The third preset format may be set as an xml format because the xml format has advantages such as openness, simplicity, self-description, separation between structure and contents, good extendability, and irrelevance with a platform, etc.

In addition, all generated execution solutions may be stored in a task queue. Thereby, the code analysis may be executed through detecting whether there is an execution solution in the task queue. During the code analysis, a code analysis tool and a code analysis rule are called according to the execution solution to execute the code analysis and obtain a code analysis result. The obtained code analysis result may be outputted and displayed to facilitate a user's query. The obtained code analysis result may be stored in an analysis result database. The code analysis result may be outputted and displayed as the code analysis result is being stored, or may be outputted and displayed via the analysis result database. The display may be in any of possible formats, such as in a WEB interface, etc.

A second example is provided.

Figure 2:
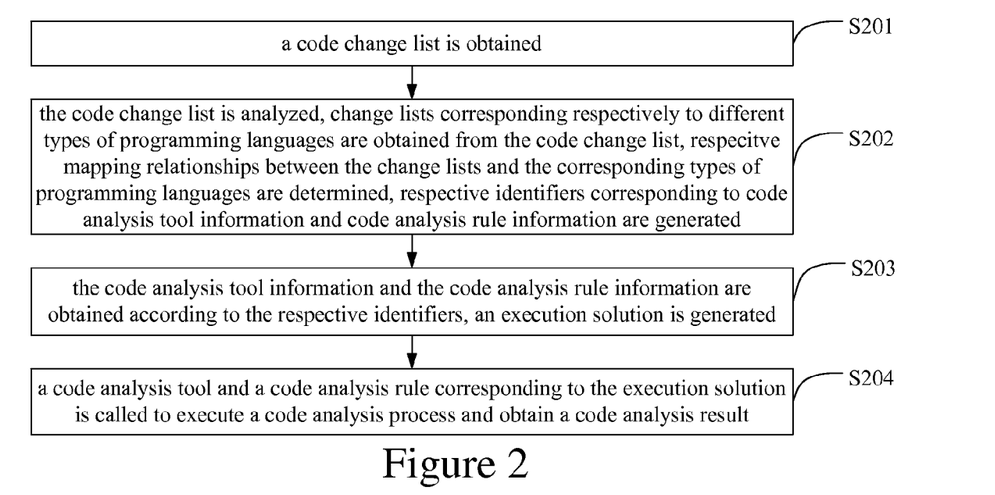
FIG. 2 is a schematic flowchart illustrating a code analysis method in accordance with a second example of the present disclosure.

FIG. 2 is a schematic flowchart illustrating a code analysis method in accordance with the second example of the present disclosure. Different from first example, respective identifiers corresponding to the mapping relationships are further generated while determining the mapping relationships, the code analysis tool information and analysis rule information corresponding to the respective identifiers are obtained, and an execution solution is generated.

As shown in FIG. 2, the code analysis method in accordance with the second example includes the following blocks.

At block S201, a code change list is obtained, and block S202 is performed.

At block S202, the code change list is analyzed, change lists corresponding respectively to different types of programming languages are obtained from the code change list, respective mapping relationships between the change lists and the corresponding types of programming languages are determined, respective identifiers corresponding to code analysis tool information and code analysis rule information are generated, and block S203 is performed.

At block S203, the code analysis tool information and the code analysis rule information are obtained according to the respective identifiers, an execution solution is generated and block S204 is performed.

At block S204, a code analysis tool and a code analysis rule corresponding to the execution solution is called to execute a code analysis process and obtain a code analysis result.

The identifiers may be generated according to the types of programming languages, the types of files, or settings performed by an external user. The identifiers indicate, show or represent which type of files should use which type of code analysis tool and which type of analysis rule to execute the code analysis process. Settings of the identifiers may be based on actual requirements and is not described in detail herein.

Other technical features of the second example are similar to those of the first example and is not described herein.

Figure 3:
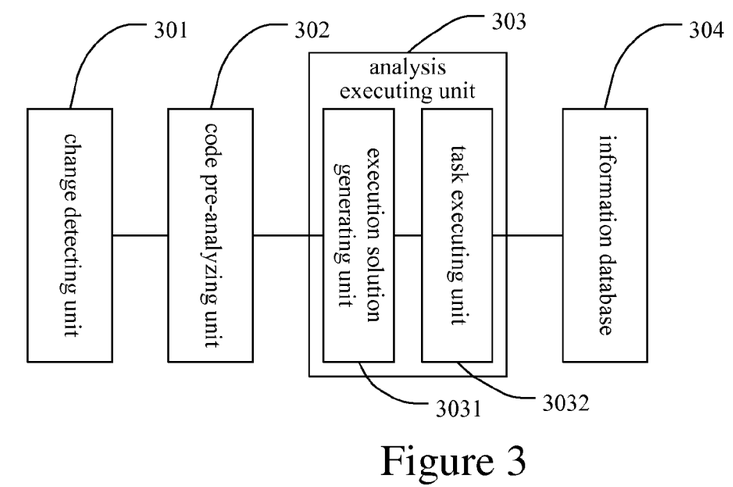
FIG. 3 is a schematic diagram illustrating the structure of a code analysis system in accordance with an example of the present disclosure.

Based on the foregoing code analysis method, a code analysis system is provided in accordance with an example of the present disclosure. FIG. 3 is a schematic diagram illustrating the structure of a code analysis system in accordance with an example of the present disclosure.

As shown in FIG. 3, the code analysis system includes a change detecting unit 301, a code pre-analyzing unit 302 and an analysis executing unit 303.

The change detecting unit 301 is configured to obtain a code change list.

The code pre-analyzing unit 302 is configured to analyze the code change list, obtain change lists corresponding respectively to different types of programming languages from the code change list, determine respective mapping relationships between the change lists and corresponding types of programming languages.

The analysis executing unit 303 is configured to obtain code analysis tool information and analysis rule information according to each of the mapping relationships, generate an execution solution, call a code analysis tool and an analysis rule according to the execution solution to execute a code analysis process and obtain a code analysis result.

The analysis executing unit 303 may include:

an execution solution generating unit 3031, configured to obtain the code analysis tool information and the analysis rule information according to each of the mapping relationships, and generate the execution solution; and a task executing unit 3032, configured to call the code analysis tool and the analysis rule according to the execution solution to execute the code analysis process and obtain the code analysis result.

According to the above technical solution, the change detecting unit 301 obtains the code change list. The code pre-analyzing unit 302 analyzes the code change list, obtains the change lists corresponding respectively to different types of programming languages from the code change list, and determines the respective mapping relationships between the change lists and the corresponding types of programming languages. The analysis executing unit 303 then generates the execution solution according to each of the mapping relationships and calls a code analysis tool and analysis rule matching with the execution solution to execute the code analysis process and obtain the code analysis result. The technical solution thereby may integrate multiple types of code analysis tools and analysis rules, meet the requirements of the code analysis on different types of programming languages, reduce the workload of a developer and a tester, and then increase efficiency of the code analysis.

When the change detecting unit 301 obtains the code change list, different triggering conditions may be configured according to different applications or considerations to obtain the code change list. In a first implementation, a scanning frequency may be preset, each code software configuration management database may be scanned according to the preset scanning frequency to obtain the code change list. In a second implementation, a code analysis instruction may be inputted when the code analysis is required, and each code software configuration management database is scanned after the code analysis instruction is received to obtain the code change list. For example, the code analysis instruction may be an operation of clicking a button for starting a code analysis process.

In an example, the first implementation may be used. In this way, a state of the code software configuration management database may be detected automatically, and the code analysis process may be triggered automatically, thereby reducing the workload of the developer and the tester.

According to actual requirements, one or more code software configuration management databases may be configured, which is not described in detail herein.

The code change list is obtained by the change detecting unit 301 from different code software configuration databases and storage formats may be different in different code software configuration management databases. Thereby, the efficiency of generating the execution solution may be affected if the code change list is directly used in the subsequent processing. Thereby, the code change list obtained by the code change list 301 may be stored in a first preset format to facilitate the processing in the code pe-analyzing unit 302.

The first preset format may be any of possible formats, as long as the first preset format is in conform with a description mode expressed by an information structure. The first preset format may be set as an xml format because the xml format has advantages such as openness, simplicity, self-description, separation between structure and contents, good extendability, and irrelevance with a platform, etc.

When the code pre-analyzing unit 302 analyzes the code change list to determine the mapping relationships, the code pre-analyzing unit 302 may determine the mapping relationships according to differences between different types of programming languages. For example, it is supposed that there are two types of programming languages C++ and Java in the code change list. After the pre-analyzing process, a mapping relationship is obtained between the programming language C++ and a change list of C++ codes which have been changed, and a mapping relationship is obtained between the programming language Java and a change list of Java codes which have been changed.

The change lists may be obtained from different code software configuration management databases, and storage formats in different code software configuration management databases may be different. Consequently, the respective mapping relationships between different types of programming languages and the corresponding change lists also have different formats. Especially, in the case that there are many types of programming languages, the efficiency of generating the execution solution may be affected if the subsequent processes are performed directly. As such, in this example, the code pre-analyzing unit 302 may be further configured to transform each of the mapping relationships to a second preset format and store each of the transformed mapping relationships. Thereby, the execution solution may be generated based on the same format no matter which type of original format is used by a change list.

The second preset format may be any of possible formats, as long as the second preset format is in conform with a description mode expressed by an information structure. Besides, the second preset format may be the same as or different from the first preset format. The second preset format may be set as an xml format because the xml format has advantages such as openness, simplicity, self-description, separation between structure and contents, good extendability, and irrelevance with a platform, etc.

The analysis executing unit 303 may obtain respective code anaylysis tool information and analysis rule information corresponding to the mapping relationships, and generate the execution solution. This process may be executed at background. In this case, a relationship between each type of programming languages, each code analysis tool and each code analysis rule needs be stored in advance. Thus, as shown in FIG. 3, the code analysis system may further include:

an information database 304, configured to store the relationship between each type of programming languages, each code analysis tool and each code analysis rule.

Thereby, when the execution solution is generated, it is thus possible to determine, based on the relationship, which code analysis tool and which code analysis rule may be used to perform the code analysis for a change list corresponding to a type of programming languages, and it is also possible to generate the execution solution based on information of the used code analysis tool and the information of the used code analysis rule.

Each generated execution solution may be sorted in a third preset format so that the code analysis based on each execution solution is performed based on the same type of formats, which may reduce complexity of executing the execution solution and further increase efficiency.

The third preset format may be any of possible formats, as long as the third preset format is in conform with a description mode expressed by an information structure. The third present format may be the same as or different from the first preset format or the second preset format. The third preset format may be set as an xml format because the xml format has advantages such as openness, simplicity, self-description, separation between structure and contents, good extendability, and irrelevance with a platform, etc.

In addition, all execution solutions generated by the analysis executing unit 303 or by the execution solution generating unit 3031 may be stored in a task queue. In this case, the analysis executing unit 301 may further include:

a task queue storage 3033, configured to store the execution solutions in a task queue.

Thereby, the task executing unit 3032 may execute the code analysis through detecting whether there is an execution solution in the task queue storage 3033. During the code analysis, a code analysis tool and a code analysis rule are called according to the execution solution to execute the code analysis and obtain a code analysis result. The code analysis tool and the code analysis rule may be called directly from the information database 304.

The code analysis result obtained by the analysis executing unit 303 or the task executing unit 3032 may be outputted and displayed to facilitate a user's query. In another aspect, the obtained code analysis result may be stored in an analysis result database, and may be outputted and displayed or may be outputted or displayed via the analysis result database. The display may be in any of possible formats, such as in a WEB interface, etc.

Corresponding to the above code analysis method in the second example of the present disclosure, the code pre-analyzing unit 302 in another example is further configured to generate respective identifiers corresponding to code analysis tool information and analysis rule information when determining the mapping relationships. Thereby, the analysis executing unit 303 is configured to obtain the code analysis tool information and the analysis rule information corresponding to the respective identifiers, and generate the execution solution. The respective identifiers may be generated in a same way as described in the examples of the code analysis method, which is not described herein.

Based on this example, the information database 304 may store code analysis tool information, code analysis rule information, and a relationship between a code analysis tool, a code analysis rule and an identifier.

According to different functions, the information database 304 in an example of the present disclosure may be divided into several databases for storing different information. For example, the information database 304 may include a tool information database, an analysis rule database and a knowledge database. The tool information database is configured to store information of each code analysis tool, the analysis rule database is configured to store information of each analysis rule, and the knowledge database is configured to store a relationship between a code analysis tool, a code analysis rule and at least one of an identifier and each type of programming languages. In addition, the information database 304 may further include an analysis result database, configured to store all code analysis results, so as to facilitate a user's query or output and display the code analysis results via the analysis result database.

The above information database 304 or the several databases may use a MySQL database to store relevant data.

Taking the tool information database for instance, the tool information database is configured to store information of each code analysis tool and is mainly configured to manage multiple types of code analysis tools. Contents stored in the tool information database is shown in an examplary table below.

| Field | Description |
| --- | --- |
| F_tool_id | KEY, Primary Key, Non-Null, Tool ID |
| F_name | Tool Name |
| F_run_mode | Calling modes of tool, and three modes supported by internal configuration: 1) command line, 2) ant, 3) interface calling |
| F_run_param | Running parameter of tool |
| F_run_env | Running environment of tool |
| F_filter_token | Token for locating a tool from the external, in a form of Key: Value, where Key represents a filtering type and Value represents a token value. For example, CodeType: C++ represents filtering by a code type and the code type is C++ |
| F_desc | Description of tool |

Taking the analysis rule database for instance, the analysis rule database is configured to store information of each analysis rule and is mainly configured to manage analysis rules supported by different types of code analysis tools. Contents in the analysis rule database is shown in an examplary table below.

| Field | Description |
| --- | --- |
| F_rule_id | KEY, Primary Key, Non-Null, Rule ID |
| F_name | Rule name |
| F_tool_id | ID Lists of tools supporting the rule |
| F_knowledge_id | ID of knowledge database entry corresponding to the rule |
| F_rule_type | Rule type, 0: a tool option, 1: a user extension rule |
| F_rule_detail | Details of the rule, supported by three description modes: tool parameters, xml and json, and covering most of code analysis tools |
| F_desc | Description of the rule |

Taking the analysis result database for instance, the analysis result database is configured to store all code analysis results. Contents in the analysis result database is shown in an examplary table below.

| Field | Description |
| --- | --- |
| F_result_id | KEY, Primary Key, Non-Null, Analysis Result, ID of code problem obtained by analysis |
| F_tool_id | ID of code analysis tool obtaining the analysis result |
| F_rule_id | Rule ID corresponding to the code analysis tool |
| F_desc | Description of the analysis result |
| F_code_evidence | Contents of codes in problem |
| F_level | Severity level of the problem |

It may be known by those skilled in the art that, during applications of the code analysis method and system, codes to be analyzed may be different according to different actual requirements. For example, it is possible to analyze only source codes according to requirements, and in this case, the code change list is a source code change list.

Figure 4:
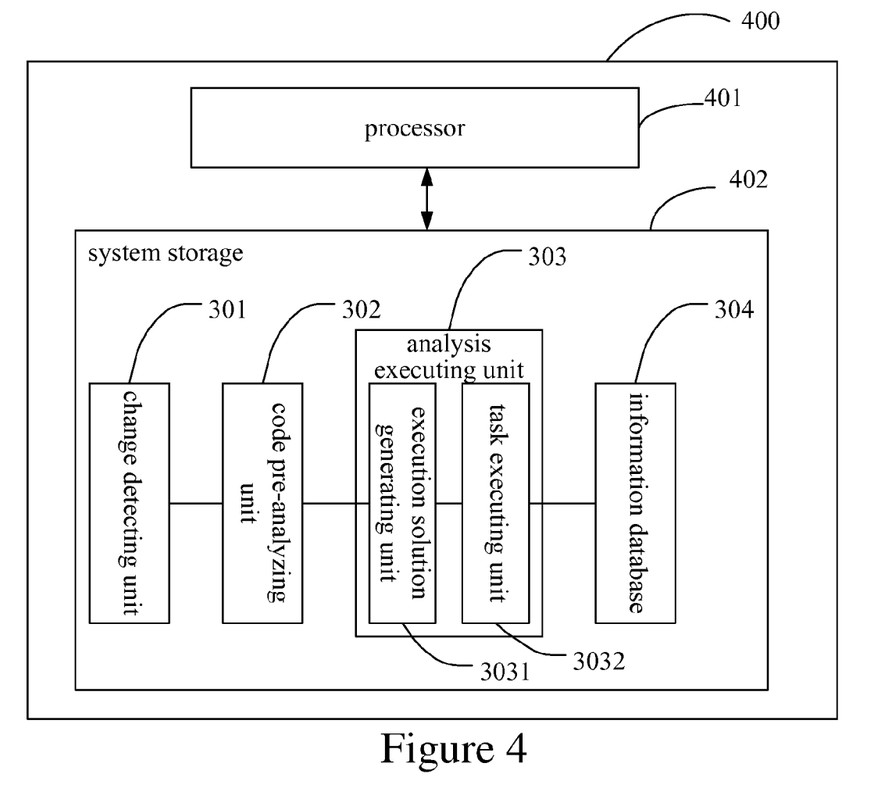
FIG. 4 is a schematic diagram illustrating an operation environment in which examples of the present disclosure may be implemented.

FIG. 4 is a schematic diagram illustrating an operation environment in which examples of the present disclosure may be implemented. As shown in FIG. 4, a computer system 400 includes a processor 401 and a system storage 402.

The computer system 400 may be any system based on a processor. Based on the system, software may be executed for a user. For example, the computer system 400 may include a desktop computer, a laptop computer or a tablet computer. Besides, the computer system 400 may further include a video game system, a Personal Digital Assistant (PDA), an intelligent phone, or a portable media player.

The processor 401 includes one or more processors or processor cores configured to execute a software module and access data stored in the system storage 402. The software module stored in the system storage 402 at least includes a change detecting unit 301, a code pre-analyzing unit 302 and an analysis executing unit 303. The system storage 402 may be any type of storage, and is configured to respectively store the software module and the data to be executed and accessed by the processor 401. According to an example, the system storage 402 may include a transitory memory, such as a Random Access Memory (RAM).

Those skilled in the art may understand that all or part of processes in the method in the foregoing examples may be implemented by hardware controlled by a computer program. The computer program may be stored in a computer readable storage medium, and may include the procedure of the method in the foregoing examples during execution of the computer program. The computer readable storage medium may be a disc, a CD, a Read-Only Memory (ROM) or a Random Access Memory (RAM), etc.

The foregoing is only examples of the present disclosure. The protection scope of the present disclosure, however, is not limited to the above description. Any change or substitution, easily occurring to those skilled in the art, should be covered by the protection scope of the present disclosure.

What is claimed is:

1. A code analysis method, comprising:
obtaining a code change list;
analyzing the code change list, obtaining a change list corresponding to each type of programming languages from the code change list, determining a mapping relationship between the change list and the type of programming languages;
obtaining code analysis tool information and analysis rule information according to the mapping relationship, and generating an execution solution; and
calling a code analysis tool and an analysis rule according to the execution solution to perform the code analysis and obtain a code analysis result;

the method further comprises at least one of:
storing the code change list in a first preset format;
storing the mapping relationship upon transforming the mapping relationship to a second preset format;
storing the execution solution upon transforming the execution solution to a third preset format; or
outputting and displaying the code analysis result,
wherein the first preset format includes an xml format, the second preset format includes an xml format, and the third preset format includes an xml format.

2. The method of claim 1, further comprising:
generating an identifier corresponding to the code analysis tool information and the analysis rule information when determining the mapping relationship; and
obtaining the code analysis tool information and the analysis rule information according to the identifier, and generating the execution solution.

3. The method of claim 1, wherein the obtaining the code change list comprises one of:
scanning a code software configuration management database in a preset scanning frequency, and obtaining the code change list; or
scanning a code software configuration management database upon receiving a code analysis instruction, and obtaining the code change list.

4. A code analysis system, operated in a computer system comprising a processor and a system storage, wherein the system storage comprises:
a change detecting unit, configured to obtain a code change list;
a code pre-analyzing unit, configured to analyze the code change list, obtain a change list corresponding to each type of programming languages from the code change list, determine a mapping relationship between the change list and the type of programming language; and
an analysis executing unit, configured to obtain code analysis tool information and analysis rule information according to the mapping relationship, and generate an execution solution, and call a code analysis tool and an analysis rule according to the execution solution to perform the code analysis and obtain a code analysis result;
the system further comprises at least one of:
a change detecting unit, configured to store the code change list in a first preset format;
a code pre-analyzing unit, configured to store the mapping relationship upon transforming the mapping relationship to a second preset format; or
an analysis executing unit, configured to store the execution solution upon transforming the execution solution to a third preset format,
wherein the first preset format comprises an xml format, the second preset format comprises an xml format, and the third preset format comprises an xml format.

5. The system of claim 4, wherein
the code pre-analyzing unit is further configured to generate an identifier corresponding to the code analysis tool information and the analysis rule information when determining the mapping relationship; and
the analysis executing unit is configured to obtain the code analysis tool information and the analysis rule information according to the identifier, and generate the execution solution.

6. The system of claim 5, further comprising:
an information database, configured to store the code analysis tool, the analysis rule, and a relationship between the the code analysis tool, the analysis rule and at least one of the identifier and the type of programming languages.

7. The system of claim 4, wherein the analysis executing unit comprises:
an execution solution generating unit, configured to obtain the code analysis tool information and the analysis rule information according to the mapping relationship, and generate the execution solution;
a task executing unit, configured to call the code analysis tool and the analysis rule according to the execution solution to perform the code analysis and obtain the code analysis result.

8. The system of claim 7, wherein the analysis executing unit further comprises:
a task queue storage, configured to store the execution solution in a task queue.

9. The system of claim 4, wherein the change detecting unit is configured to perform one of:
scanning a code software configuration management database in a preset scanning frequency, and obtain the code change list; or
scanning a code software configuration management database upon receiving a code analysis instruction, and obtain the code change list.

10. One or more computer storage mediums containing a computer-executable instruction, wherein the computer-executable instruction is configured to perform a code analysis method, and the code analysis method comprises:
obtaining a code change list;
analyzing the code change list, obtaining a change list corresponding to each type of programming languages from the code change list, determining a mapping relationship between the change list and the type of programming languages;
obtaining code analysis tool information and analysis rule information according to the mapping relationship, and generating an execution solution; and
calling a code analysis tool and an analysis rule according to the execution solution to perform the code analysis and obtain a code analysis result;
wherein the method further comprises at least one of:
storing the code change list in a first preset format;
storing the mapping relationship upon transforming the mapping relationship to a second preset format;
storing the execution solution upon transforming the execution solution to a third preset format; or
outputting and displaying the code analysis result
wherein the first preset format comprises an xml format, the second preset format comprises an xml format, and the third preset format comprises an xml format.

11. The computer storage medium of claim 10, wherein the method further comprises:
generating an identifier corresponding to the code analysis tool information and the analysis rule information when determining the mapping relationship; and
obtaining the code analysis tool information and the analysis rule information according to the identifier, and generating the execution solution.

12. The computer storage medium of claim 10, wherein the obtaining the code change list comprises one of:
scanning a code software configuration management database in a preset scanning frequency, and obtaining the code change list; or scanning a code software configuration management database upon receiving a code analysis instruction, and obtaining the code change list.

\* \* \* \* \*